(12) United States Patent
Wang et al.

(10) Patent No.: US 11,991,633 B2
(45) Date of Patent: May 21, 2024

(54) RESOURCE CONFIGURATION METHOD, RESOURCE OBTAINING METHOD, NETWORK DEVICE AND TERMINAL

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Zheng Zhao, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 407 days.

(21) Appl. No.: 17/420,709

(22) PCT Filed: Jan. 3, 2020

(86) PCT No.: PCT/CN2020/070230
§ 371 (c)(1),
(2) Date: Jul. 5, 2021

(87) PCT Pub. No.: WO2020/140966
PCT Pub. Date: Jul. 9, 2020

(65) Prior Publication Data
US 2022/0110057 A1   Apr. 7, 2022

(30) Foreign Application Priority Data

Jan. 4, 2019 (CN) .......................... 201910008258.9
Aug. 8, 2019 (CN) .......................... 201910731340.4

(51) Int. Cl.
*H04W 52/02* (2009.01)
*H04W 72/0446* (2023.01)
(Continued)

(52) U.S. Cl.
CPC ... *H04W 52/0232* (2013.01); *H04W 52/0216* (2013.01); *H04W 52/0235* (2013.01);
(Continued)

(58) Field of Classification Search
CPC ......... H04W 52/0232; H04W 52/0216; H04W 52/0235; H04W 52/0229; H04W 52/028;
(Continued)

(56) References Cited

U.S. PATENT DOCUMENTS

2017/0135135 A1   5/2017 Pelletier et al.

FOREIGN PATENT DOCUMENTS

CN          108633070 A      10/2018
KR    10-2018-0121350 A      11/2018
(Continued)

OTHER PUBLICATIONS

International Search Report in the international application No. PCT/CN2020/070230, dated Mar. 30, 2020, with English translation provided by WIPO.
(Continued)

*Primary Examiner* — Farid Seyedvosoghi
(74) *Attorney, Agent, or Firm* — Ladas & Parry, LLP

(57) ABSTRACT

The present disclosure provides a resource configuration method, a resource obtaining method, a network device and a terminal, so as to solve the problem that there is currently no scheme about how to configure a power-saving signal within an opportunity for DRX. The resource configuration method includes configuring a transmission resource for a power-saving signal within an opportunity for DRX statically or semi-statically.

20 Claims, 4 Drawing Sheets

(51) Int. Cl.
*H04W 72/23* (2023.01)
*H04W 72/56* (2023.01)

(52) U.S. Cl.
CPC ....... *H04W 72/0446* (2013.01); *H04W 72/23* (2023.01); *H04W 72/56* (2023.01)

(58) Field of Classification Search
CPC . H04W 72/0446; H04W 72/23; H04W 72/56; H04W 76/28; Y02D 30/70; H04L 5/0053
See application file for complete search history.

(56) References Cited

FOREIGN PATENT DOCUMENTS

| | | | | |
|---|---|---|---|---|
| WO | 2018097680 | A1 | 5/2018 | |
| WO | 2018/175760 | A1 | 9/2018 | |
| WO | 2018169649 | A1 | 9/2018 | |
| WO | 2018174635 | A1 | 9/2018 | |
| WO | WO-2018169649 | A1 * | 9/2018 | ........... H04L 5/0053 |
| WO | WO-2018175760 | A1 * | 9/2018 | ........ H04W 52/0216 |
| WO | 2018/203717 | A1 | 11/2018 | |
| WO | 2018202693 | | 11/2018 | |
| WO | 2018204799 | | 11/2018 | |

OTHER PUBLICATIONS

Written Opinion of the International Searching Authority in the international application No. PCT/CN2020/070230, dated Mar. 30, 2020, with English translation provided by WIPO.
International Preliminary Report on Patentability for international application No. PCT/CN2020/070230, dated Jun. 16, 2021, all pages, with English translation provided by WIPO.
"Wake-up signal configurations and procedures", 3GPP TSG RAN WG1 Meeting #90bis R1-1718141 Prague, Czechia, Oct. 9-13, 2017; Agenda item: 6.2.6.1.1.2; Source: Qualcomm Incorporated , all pages.
"Triggering Adaptation of UE Power Consumption Characteristics" 3GPP TSG-RAN WG1 meeting #94bis R1-1811283 Oct. 8-12, 2018 Chengdu, China Agenda item: 7.2.9.2.2 Source: Qualcomm Incorporated, all pages.
Extended European Search Report from EP app. No. 20736066.0, dated Jan. 10, 2022, all pages.
First Office Action for Japanese Patent Application 2021-539365 dated Jul. 5, 2022 by the Japanese Patent Office, and its English translation provided by foreign associate.
First Office Action for Korean Patent Application 10-2021-7023717 dated Aug. 18, 2022 by the Korean Patent Office, and its English translation provided by Korean Patent Office.
"Triggering Adaptation of UE Power Consumption Characteristics," 3GPP TSG-RAN WG1 Meeting #95, R1-1813448, Agenda item: 7.2.9.2.2, Source: Qualcomm Incorporated, all pages.

* cited by examiner

RESOURCE CONFIGURATION METHOD, RESOURCE OBTAINING METHOD, NETWORK DEVICE AND TERMINAL

CROSS-REFERENCE TO RELATED APPLICATIONS

The present application is the U.S. national phase of PCT Application No. PCT/CN2020/070230 filed on Jan. 3, 2020, which claims priority to the Chinese patent application No. 201910008258.9 filed on Jan. 4, 2019 and the Chinese patent application No. 201910731340.4 filed on Aug. 8, 2019, the disclosures of which are incorporated herein by reference in their entireties.

TECHNICAL FIELD

The present disclosure relates to the field of communication application, in particular to a resource configuration method, a resource obtaining method, a network device and a terminal.

BACKGROUND

In a $5^{th}$-Generation (5G) New Radio (NR) system, a Discontinuous Reception (DRX) mechanism is adopted to save power. With a DRX cycle, a User Equipment (UE) merely monitors a Physical Downlink Control Channel (PDCCH) within a DRX on duration, and the UE does not receive the PDCCH within an opportunity for DRX (also called as DRX off) to reduce the power consumption, i.e., it enters a sleep mode.

In order to rapidly respond to a scheduling operation from a base station and reduce latency for the UE, it is very difficult to set a relatively long time for the opportunity for DRX in a mobile communication system. When the UE is frequently switched between the DRX on duration and the opportunity for DRX, a power-saving effect may be adversely affected.

In a Narrow Band-Internet of Things (NB-IoT), the detection of a paging signal is triggered through a Wake Up Signal (WUS), as shown in FIG. 1. In FIG. 1, each vertical dotted line represents a paging opportunity. When there is no WUS, the UE in a Radio Resource Control idle (RRC_IDLE) state needs to be woken up periodically to receive a possible paging signal on each Paging Occasion (PO). Before detecting the possible paging signal each time, the UE needs to perform blind detection on the PDCCH for the paging signal, and when the PDCCH for the paging signal has been detected, the UE continues to decode the paging signal; otherwise, it may not decode the paging signal any more. In another method, the WUS is transmitted before the paging signal. When the WUS has been detected, the UE may start to perform the blind detection on the PDCCH for the paging signal, and when no WUS has been detected, the UE may discard the detection of the paging signal within the PO. The WUS may be designed as a sequence, and its detection complexity is far less than blind detection complexity of the PDCCH, so through the use of the WUS, it is able to remarkably reduce the reception power consumption. However, for the NB-IOT, there is no scheme about how to configure a power-saving signal within the opportunity for DRX.

SUMMARY

An object of the present disclosure is to provide a resource configuration method, a resource obtaining method, a network device and a terminal, so as to solve the problem in the related art where there is currently no scheme about how to configure a power-saving signal within the opportunity for DRX.

In one aspect, the present disclosure provides in some embodiments a resource configuration method for a network device, including configuring a transmission resource for a power-saving signal within an opportunity for DRX statically or semi-statically.

In some possible embodiments of the present disclosure, the configuring the transmission resource for the power-saving signal within the opportunity for DRX includes: configuring at least two candidate transmission resources for the power-saving signal within the opportunity for DRX; and determining the transmission resource for the power-saving signal within the opportunity for DRX in accordance with the at least two candidate transmission resources for the power-saving signal and a transmission resource for a predetermined high-priority signal.

In some possible embodiments of the present disclosure, the configuring the at least two candidate transmission resources for the power-saving signal within the opportunity for DRX includes configuring a plurality of resource windows in accordance with a predetermined configuration period, each resource window of the plurality of resource windows includes at least two candidate transmission resources, and the at least two candidate transmission resources include a default candidate transmission resource.

In some possible embodiments of the present disclosure, each of the plurality of resource windows includes a time-domain resource window and/or a frequency-domain resource window.

In some possible embodiments of the present disclosure, the determining the transmission resource for the power-saving signal within the opportunity for DRX in accordance with the at least two candidate transmission resources for the power-saving signal and the transmission resource for the predetermined high-priority signal includes, in the case that the default candidate transmission resource for the power-saving signal overlaps the transmission resource for the predetermined high-priority signal, determining the transmission resource for the power-saving signal within the opportunity for DRX in accordance with the candidate transmission resources in the resource window other than the default candidate transmission resource.

In some possible embodiments of the present disclosure, the configuring the at least two candidate transmission resources for the power-saving signal within the opportunity for DRX includes configuring the at least two candidate transmission resources for the power-saving signal within the opportunity for DRX before a DRX on duration.

In some possible embodiments of the present disclosure, the determining the transmission resource for the power-saving signal within the opportunity for DRX in accordance with the candidate transmission resources for the power-saving signal and the transmission for the predetermined high-priority signal includes: obtaining a distance value between each candidate transmission resource of the at least two candidate transmission resources and the transmission resource for the predetermined high-priority signal; selecting a target distance value from a plurality of distance values; and determining the transmission resource for the power-saving signal within the opportunity for DRX in accordance with the target distance value.

In some possible embodiments of the present disclosure, the selecting the target distance value from the plurality of distance values includes selecting a minimum distance value from distance values greater than a first predetermined threshold as the target distance value.

In some possible embodiments of the present disclosure, the determining the transmission resource for the power-saving signal within the opportunity for DRX in accordance with the target distance value includes: determining the transmission resource for the power-saving signal within the opportunity for DRX in accordance with a candidate transmission resource corresponding to the target distance value; or determining a pre-agreed candidate transmission resource as the transmission resource for the power-saving signal within the opportunity for DRX in the case that the target distance value is greater than a second predetermined threshold; or determining the transmission resource for the power-saving signal within the opportunity for DRX in accordance with an idle resource within a slot where the predetermined high-priority signal for calculating the target distance value is located.

In some possible embodiments of the present disclosure, the configuring the transmission resource for the power-saving signal within the opportunity for DRX includes configuring a carrier for the power-saving signal within the opportunity for DRX, and the carrier is a primary carrier or a primary/secondary carrier.

In some possible embodiments of the present disclosure, the configuring the transmission resource for the power-saving signal within the opportunity for DRX includes configuring a Bandwidth Part (BWP) for the power-saving signal within the opportunity for DRX, and the BWP is a cell-specific narrow-band BWP or a pre-agreed narrow-band BWP.

In some possible embodiments of the present disclosure, the configuring the transmission resource for the power-saving signal within the opportunity for DRX includes configuring the transmission resource for the power-saving signal within the opportunity for DRX in accordance with a currently active BWP.

In some possible embodiments of the present disclosure, the configuring the transmission resource for the power-saving signal within the opportunity for DRX in accordance with the currently active BWP includes configuring the transmission resource for the power-saving signal within the opportunity for DRX in accordance with a search space for a PDCCH corresponding to the currently active BWP.

In some possible embodiments of the present disclosure, the transmission resource includes a first transmission resource and a second transmission resource, the first transmission resource includes a fixed frequency-domain resource and a variable time-domain resource, and the second transmission includes a fixed time-domain resource and a variable frequency-domain resource.

In some possible embodiments of the present disclosure, subsequent to configuring the transmission resource for the power-saving signal within the opportunity for DRX statically or semi-statically, the resource configuration method further includes, in the case that the transmission resource for the power-saving signal for the opportunity for DRX overlaps the transmission resource for the predetermined high-priority signal, discarding the transmission of the power-saving signal on the transmission resource overlapping the transmission resource for the predetermined high-priority signal or transmitting the power-saving signal in a punching manner.

In some possible embodiments of the present disclosure, the resource configuration method further includes, when the transmission resource for the power-saving signal for the opportunity for DRX overlaps the transmission resource for the predetermined high-priority signal, transmitting indication information.

In some possible embodiments of the present disclosure, the indication information is used to indicate a terminal to discard the detection of the power-saving signal on the transmission resource overlapping the transmission resource for the predetermined high-priority signal and to be maintained in a sleep state, or indicate the terminal to discard the detection of the power-saving signal on the transmission resource overlapping the transmission resource for the predetermined high-priority signal and enter a wake-up state, or indicate the terminal to detect the power-saving signal transmitted in a punching manner on the transmission resource overlapping the transmission resource for the predetermined high-priority signal.

In some possible embodiments of the present disclosure, subsequent to configuring the transmission resource for the power-saving signal within the opportunity for DRX statically or semi-statically, the resource configuration method further includes, when the transmission resource for the power-saving signal within the opportunity for DRX does not overlap the transmission resource for the predetermined high-priority signal, transmitting the power-saving signal on the transmission resource.

In some possible embodiments of the present disclosure, the predetermined high-priority signal includes at least one of a System Information Block (SIB), a Channel State Information-Reference Signal (CSI-RS), Remaining Minimum System Information (RMSI), a Tracking Reference Signal (TRS) or Other System Information (OSI).

In some possible embodiments of the present disclosure, the transmission resource is configured periodically, a configuration period of the transmission resource is greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration is the transmission resource for the power-saving signal.

In some possible embodiments of the present disclosure, a start position of a DRX cycle is the same as a start position of a cycle of a kernel power-saving signal, and the DRX cycle is an integral multiple of the cycle of the kernel power-saving signal.

In some possible embodiments of the present disclosure, the power-saving signal is a sequence, and the kernel power-saving signal is a subsequence having a fixed length in the sequence.

In some possible embodiments of the present disclosure, the configuring the transmission resource for the power-saving signal within the opportunity for DRX statically or semi-statically includes configuring the transmission resource for the power-saving signal through RRC signaling or physical layer dynamic signaling, and the transmission resource for the power-saving signal includes at least one of a Downlink (DL) symbol or slot, an Uplink (UL) symbol or slot, or a flexible symbol or slot.

In some possible embodiments of the present disclosure, the resource configuration method further includes: when the transmission resource for the power-saving signal includes a DL symbol or slot, transmitting the power-saving signal on the DL symbol or slot; when the transmission resource for the power-saving signal includes an UL symbol or slot, discarding the transmission of the power-saving signal; or when the transmission resource for the power-saving signal includes a flexible symbol or slot configured through physical layer signaling, discarding the transmission of the power-saving signal.

In some possible embodiments of the present disclosure, the configuring the transmission resource for the power-saving signal within the opportunity for DRX statically or semi-statically includes configuring the transmission resource for the power-saving signal statically or semi-statically on a symbol or slot other than the UL symbol or slot and/or the flexible symbol or slot configured through dynamic signaling.

In another aspect, the present disclosure provides in some embodiments a resource obtaining method for a terminal, including obtaining a transmission resource for a power-saving signal within an opportunity for DRX statically or semi-statically.

In some possible embodiments of the present disclosure, subsequent to obtaining the transmission resource for the power-saving signal within the opportunity for DRX statically or semi-statically, the resource obtaining method further includes, in the case that the transmission resource for the power-saving signal within the opportunity for DRX overlaps a transmission resource for a predetermined high-priority signal, discarding the detection of the power-saving signal on the transmission resource overlapping the transmission resource for the predetermined high-priority signal or detecting the power-saving signal transmitted in a punching manner.

In some possible embodiments of the present disclosure, subsequent to obtaining the transmission resource for the power-saving signal within the opportunity for DRX, the resource obtaining method further includes: obtaining indication information, the indication information being transmitted by a network device in the case that the transmission resource for the power-saving signal within the opportunity for DRX overlaps the transmission resource for the predetermined high-priority signal; and discarding the detection of the power-saving signal on the transmission resource overlapping the transmission resource for the predetermined high-priority signal and maintaining a sleep state in accordance with the indication information, or discarding the detection of the power-saving signal on the transmission resource overlapping the transmission resource for the predetermined high-priority signal and entering a wake-up state in accordance with the indication information, or detecting the power-saving signal transmitted in a punching manner on the transmission resource overlapping the transmission resource for the predetermined high-priority signal.

In some possible embodiments of the present disclosure, subsequent to obtaining the transmission resource for the power-saving signal within the opportunity for DRX, the resource obtaining method further includes: obtaining the power-saving signal on the transmission resource; and monitoring a PDCCH within a DRX on duration after the opportunity for DRX in accordance with the power-saving signal.

In some possible embodiments of the present disclosure, the resource obtaining method further includes: when the transmission resource for the power-saving signal configured by the network device is incapable of being used to transmit the power-saving signal, directly waking up, by the terminal, a receiver and monitoring the PDCCH within a corresponding DRX cycle; or when the transmission resource for the power-saving signal configured by the network device is incapable of being used to transmit the power-saving signal, performing, by the terminal, a sleep operation continuously and not detecting the PDCCH within a subsequent DRX cycle.

In some possible embodiments of the present disclosure, the resource obtaining method further includes, when the transmission resource for the energy signal configured for the terminal is a flexible symbol or slot configured through RRC signaling, detecting, by the terminal, the power-saving signal on the transmission resource for the power-saving signal.

In yet another aspect, the present disclosure provides in some embodiments a network device, including a transceiver, a memory, a processor, and a computer program stored in the memory and executed by the processor. The processor is configured to execute the computer program so as to configure a transmission resource for a power-saving signal within an opportunity for DRX statically or semi-statically.

In some possible embodiments of the present disclosure, the processor is further configured to execute the computer program so as to: configure at least two candidate transmission resources for the power-saving signal within the opportunity for DRX; and determine the transmission resource for the power-saving signal within the opportunity for DRX in accordance with the at least two candidate transmission resources for the power-saving signal and a transmission resource for a predetermined high-priority signal.

In some possible embodiments of the present disclosure, the processor is further configured to execute the computer program so as to configure a plurality of resource windows in accordance with a predetermined configuration period, each resource window of the plurality of resource windows includes at least two candidate transmission resources, and the at least two candidate transmission resources includes a default candidate transmission resource.

In some possible embodiments of the present disclosure, each of the plurality of resource windows includes a time-domain resource window and/or a frequency-domain resource window.

In some possible embodiments of the present disclosure, the processor is further configured to execute the computer program so as to, in the case that the default candidate transmission resource for the power-saving signal overlaps the transmission resource for the predetermined high-priority signal, determine the transmission resource for the power-saving signal within the opportunity for DRX in accordance with the candidate transmission resources in the resource window other than the default candidate transmission resource.

In some possible embodiments of the present disclosure, the processor is further configured to execute the computer program so as to configure the at least two candidate transmission resources for the power-saving signal within the opportunity for DRX before a DRX on duration.

In some possible embodiments of the present disclosure, the processor is further configured to execute the computer program so as to: obtain a distance value between each candidate transmission resource of the at least two candidate transmission resources and the transmission resource for the predetermined high-priority signal; select a target distance value from a plurality of distance values; and determine the transmission resource for the power-saving signal within the opportunity for DRX in accordance with the target distance value.

In some possible embodiments of the present disclosure, the processor is further configured to execute the computer program so as to select a minimum distance value from distance values greater than a first predetermined threshold as the target distance value.

In some possible embodiments of the present disclosure, the processor is further configured to execute the computer program so as to: determine the transmission resource for the power-saving signal within the opportunity for DRX in accordance with a candidate transmission resource corresponding to the target distance value; or determine a pre-agreed candidate transmission resource as the transmission resource for the power-saving signal within the opportunity for DRX in the case that the target distance value is greater than a second predetermined threshold; or determine the transmission resource for the power-saving signal within the opportunity for DRX in accordance with an idle resource within a slot where the predetermined high-priority signal for calculating the target distance value is located.

In some possible embodiments of the present disclosure, the processor is further configured to execute the computer program so as to configure a carrier for the power-saving signal within the opportunity for DRX, and the carrier is a primary carrier or a primary/secondary carrier.

In some possible embodiments of the present disclosure, the processor is further configured to execute the computer program so as to configure a BWP for the power-saving signal within the opportunity for DRX, and the BWP is a cell-specific narrow-band BWP or a pre-agreed narrow-band BWP.

In some possible embodiments of the present disclosure, the processor is further configured to execute the computer program so as to configure the transmission resource for the power-saving signal within the opportunity for DRX in accordance with a currently active BWP.

In some possible embodiments of the present disclosure, the processor is further configured to execute the computer program so as to configure the transmission resource for the power-saving signal within the opportunity for DRX in accordance with a search space for a PDCCH corresponding to the currently active BWP.

In some possible embodiments of the present disclosure, the transmission resource includes a first transmission resource and a second transmission resource, the first transmission resource includes a fixed frequency-domain resource and a variable time-domain resource, and the second transmission includes a fixed time-domain resource and a variable frequency-domain resource.

In some possible embodiments of the present disclosure, the processor is further configured to execute the computer program so as to, in the case that the transmission resource for the power-saving signal for the opportunity for DRX overlaps the transmission resource for the predetermined high-priority signal, discard the transmission of the power-saving signal on the transmission resource overlapping the transmission resource for the predetermined high-priority signal or transmit the power-saving signal in a punching manner.

In some possible embodiments of the present disclosure, the processor is further configured to execute the computer program so as to, when the transmission resource for the power-saving signal for the opportunity for DRX overlaps the transmission resource for the predetermined high-priority signal, transmit indication information.

In some possible embodiments of the present disclosure, the indication information is used to indicate a terminal to discard the detection of the power-saving signal on the transmission resource overlapping the transmission resource for the predetermined high-priority signal and to be maintained in a sleep state, or indicate the terminal to discard the detection of the power-saving signal on the transmission resource overlapping the transmission resource for the predetermined high-priority signal and enter a wake-up state, or indicate the terminal to detect the power-saving signal transmitted in a punching manner on the transmission resource overlapping the transmission resource for the predetermined high-priority signal.

In some possible embodiments of the present disclosure, the processor is further configured to execute the computer program so as to, when the transmission resource for the power-saving signal within the opportunity for DRX does not overlap the transmission resource for the predetermined high-priority signal, transmit the power-saving signal on the transmission resource.

In some possible embodiments of the present disclosure, the predetermined high-priority signal includes at least one of an SIB, a CSI-RS, RMSI, a TRS or OSI.

In some possible embodiments of the present disclosure, the transmission resource is configured periodically, a configuration period of the transmission resource is greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration is the transmission resource for the power-saving signal.

In some possible embodiments of the present disclosure, a start position of a DRX cycle is the same as a start position of a cycle of a kernel power-saving signal, and the DRX cycle is an integral multiple of the cycle of the kernel power-saving signal.

In some possible embodiments of the present disclosure, the power-saving signal is a sequence, and the kernel power-saving signal is a subsequence having a fixed length in the sequence.

In still yet another aspect, the present disclosure provides in some embodiments a computer-readable storage medium storing therein a computer program. The computer program is executed by a processor so as to implement the steps of the above-mentioned resource configuration method.

In still yet another aspect, the present disclosure provides in some embodiments a terminal, including a transceiver, a memory, a processor, and a computer program stored in the memory and executed by the processor. The processor is configured to execute the computer program so as to obtain a transmission resource for a power-saving signal within an opportunity for DRX statically or semi-statically.

In some possible embodiments of the present disclosure, the processor is further configured to execute the computer program so as to, in the case that the transmission resource for the power-saving signal within the opportunity for DRX overlaps a transmission resource for a predetermined high-priority signal, discard the detection of the power-saving signal on the transmission resource overlapping the transmission resource for the predetermined high-priority signal or detect the power-saving signal transmitted in a punching manner.

In some possible embodiments of the present disclosure, the processor is further configured to execute the computer program so as to: obtain indication information, the indication information being transmitted by a network device in the case that the transmission resource for the power-saving signal within the opportunity for DRX overlaps the transmission resource for the predetermined high-priority signal;

and discard the detection of the power-saving signal on the transmission resource overlapping the transmission resource for the predetermined high-priority signal and maintain a sleep state in accordance with the indication information, or discard the detection of the power-saving signal on the transmission resource overlapping the transmission resource for the predetermined high-priority signal and enter a wake-up state in accordance with the indication information, or detect the power-saving signal transmitted in a punching manner on the transmission resource overlapping the transmission resource for the predetermined high-priority signal.

In some possible embodiments of the present disclosure, the processor is further configured to execute the computer program so as to: obtain the power-saving signal on the transmission resource; and monitor a PDCCH within a DRX on duration after the opportunity for DRX in accordance with the power-saving signal.

In still yet another aspect, the present disclosure provides in some embodiments a computer-readable storage medium storing therein a computer program. The computer program is executed by a processor so as to implement the steps of the above-mentioned resource obtaining method.

In still yet another aspect, the present disclosure provides in some embodiments a network device, including a configuration module configured to configure a transmission resource for a power-saving signal within an opportunity for DRX statically or semi-statically.

In still yet another aspect, the present disclosure provides in some embodiments a terminal, including a first obtaining module configured to obtain a transmission resource for a power-saving signal within an opportunity for DRX statically or semi-statically.

According to the embodiments of the present disclosure, the transmission resource for the power-saving signal within the opportunity for DRX may be configured statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

DETAILED DESCRIPTION

In order to make the objects, the technical solutions and the advantages of the present disclosure more apparent, the present disclosure will be described hereinafter in a clear and complete manner in conjunction with the drawings and embodiments.

In a 5G NR system, operating states of a UE include an RRC_IDLE state, an RRC_inactive state and an RRC_connected state. In the first two states, the UE needs to monitor a paging signal. When the UE has received the paging signal, it means that there is data transmitted from a network side, and the UE needs to enter the RRC_connected state to receive downlink data. The UE in the RRC_connected state needs to continuously monitor a PDCCH, so as to obtain information transmitted through a Physical Downlink Shared Channel (PDSCH). Usually, a packet-based data stream is bursty, i.e., data is transmitted within a certain time period but not transmitted within a next long time period, so energy is inevitably rapidly consumed by the UE when the PDCCH is monitored continuously. Hence, when there is no data transmission, the UE may stop receiving the PDCCH (at this time, the UE may stop PDCCH blind detection) to reduce the power consumption. As designed by the $3^{rd}$-Generation Partnership Project (3GPP), a DRX mechanism is adopted to save energy. With a DRX cycle, the UE merely monitors the PDCCH within a DRX on duration, and the UE does not receive the PDCCH within an opportunity for DRX (also called as DRX off) to reduce the power consumption, i.e., it enters a sleep mode.

There are the three states, i.e., the RRC_IDLE state, the RRC_inactive state and the RRC_active state in the NR system. With reference to a concept of an NB-IOT, a power-saving signal is transmitted by a base station within the opportunity for DRX. When the power-saving signal has been detected before the DRX on duration, the UE may monitor the PDCCH within the subsequent DRX on duration; otherwise, it may be in the sleep state continuously and may not detect the PDCCH within the DRX on duration. The NR system is greatly different from an LTE NB-IoT in terms of frame structure, bandwidth, control channel, synchronizing channel, etc. Hence, for the NR system, it is necessary to consider how to transmit the power-saving signal, i.e., a power-saving channel. The power-saving signal in the NR is a broader concept than the WUS in the NB-IoT and it includes a power-saving signal before the DRX on duration and a power-saving signal within the DRX on duration. There is currently no scheme about how to configure the power-saving signal within the opportunity for DRX.

Figure 1:
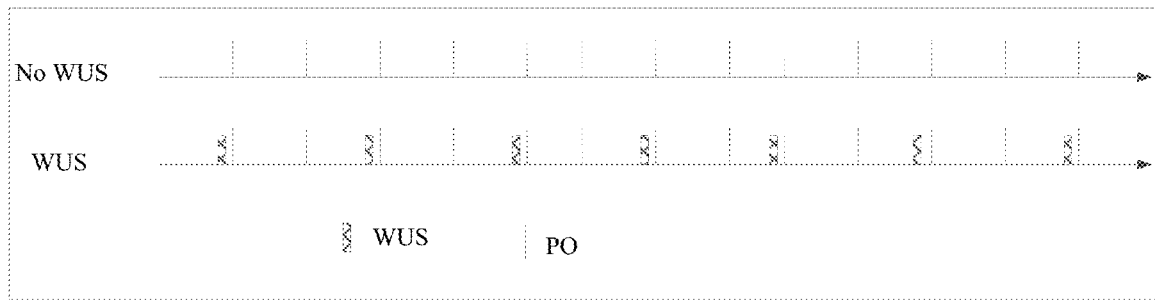
FIG. 1 is a schematic view showing a working mechanism of a WUS.
Figure 2:
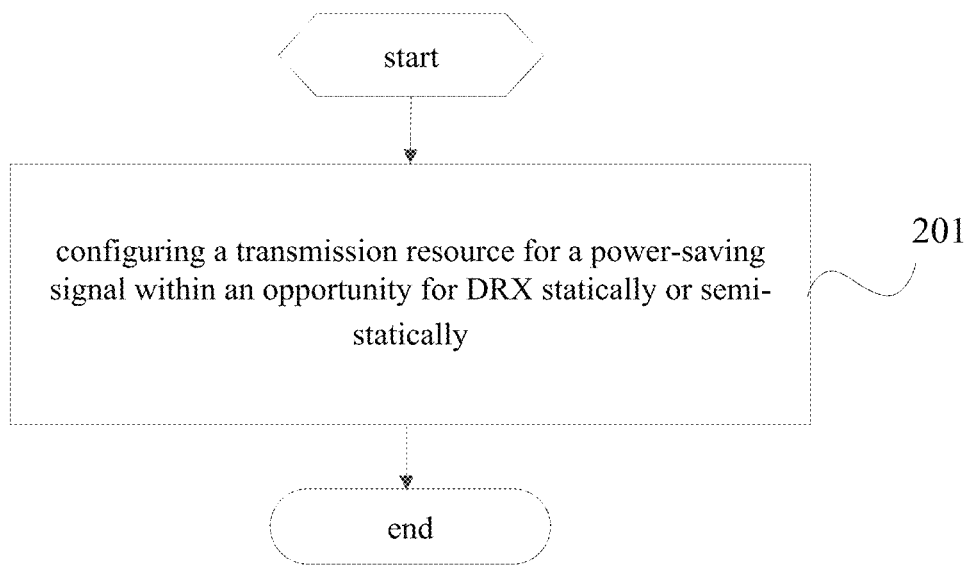
FIG. 2 is a flow chart of a resource configuration method according to some embodiments of the present disclosure.

Based on the above, the present disclosure provides in some embodiments a resource configuration method for a network device, e.g., a base station. As shown in FIG. 2, the resource configuration method includes Step 201 of configuring a transmission resource for a power-saving signal within an opportunity for DRX statically or semi-statically.

The configuring the transmission resource for the power-saving signal within the opportunity for DRX semi-statically may include configuring the transmission resource for the power-saving signal within the opportunity for DRX semi-statically through RRC signaling.

The configuring the transmission resource for the power-saving signal within the opportunity for DRX statically may include configuring the transmission resource for the power-saving signal within the opportunity for DRX statically in a pre-agreed manner.

In some embodiments of the present disclosure, the power-saving signal may be a sequence, specifically a WUS.

In some embodiments of the present disclosure, when the power-saving signal has been detected within the opportunity for DRX, a terminal may monitor a PDCCH within a subsequent DRX on duration; otherwise, it may continue to be in a sleep state and may not detect the PDCCH within the DRX on duration.

According to the resource configuration method in the embodiments of the present disclosure, the transmission resource for the power-saving signal within the opportunity for DRX may be configured statically or semi-statically, so as to facilitate the subsequent transmission of the power-saving signal within the opportunity for DRX and enable the terminal to determine whether it is necessary to detect the PDCCH within the DRX on duration in accordance with the power-saving signal. As a result, it is able to reduce the unnecessary PDCCH detection, thereby to reduce the power consumption for the terminal.

In some possible embodiments of the present disclosure, subsequent to configuring the transmission resource for the power-saving signal within the opportunity for DRX statically or semi-statically, the resource configuration method further includes transmitting the power-saving signal on the transmission resource.

To be specific, when the transmission resource for the power-saving signal within the opportunity for DRX does not overlap a transmission resource for a predetermined high-priority signal, the power-saving signal may be transmitted on the transmission resource.

Here, the terminal may monitor the PDCCH within a first DRX on duration after the opportunity for DRX in accordance with the power-saving signal.

In some embodiments of the present disclosure, the predetermined high-priority signal may include at least one of an SSB, a CSI-RS, RMSI, a TRS or OSI.

The transmission resource for the predetermined high-priority signal may include at least of a transmission for the SSB, a transmission resource for the CSI-RS, a transmission resource for the TRS, a transmission resource for a PDCCH corresponding to the RMSI, and a transmission resource for a PDCCH corresponding to the OSI.

In some possible embodiments of the present disclosure, subsequent to configuration the transmission resource for the power-saving signal within the opportunity for DRX statically or semi-statically, the resource configuration method may further include, in the case that the transmission resource for the power-saving signal within the opportunity for DRX overlaps the transmission resource for the predetermined high-priority signal, discarding the transmission of the power-saving signal on the transmission resource overlapping the transmission resource for the predetermined high-priority signal, or transmitting the power-saving signal in a punching manner.

To be specific, a base station may semi-statically configure time and frequency resources for the power-saving signal. When the base station configures the time and frequency resources, the predetermined high-priority signal in a system, e.g., broadcast information or reference signal such as the SSB, the CSI-RS, the TRS, the RMSI and the OSI, may be avoided as possible, because the broadcast information, e.g., the SSB, the RMSI and the OSI, is transmitted with respect to all users, while the reference signals, e.g., the CSI-RS and the TRS, are designed for a plurality of users. Reception performance of other users may not be adversely affected by the transmission of the power-saving signal for a certain user, and the reception of the original broadcast information and reference signals each with a high priority level may not be adversely affected, so these signals must be avoided. However, in actual use, usually these high-priority signals are transmitted periodically and there is a large quantity of these high-priority signals, so it is less likely to fully avoid these high-priority signals. Based on the above, a scheme is proposed in the embodiments of the present disclosure and it will be described hereinafter.

When there is a collision between the transmission resource for the power-saving signal and the transmission resource for the SSB, the CSI-RS or the TRS or the transmission for the PDCCH corresponding to the RMSI or OSI (e.g., a part of or all of resources in a control resource set CORESET #0), the base station may discard the transmission of the power-saving signal or transmit the power-saving signal in a punching manner.

At this time, there may exist three kinds of behaviors for the UE. (1) The UE may discard the detection of the power-saving signal on the transmission resource colliding with the transmission resource for the predetermined high-priority signal, and continue to be maintained in the sleep state. For example, when an RE collision occurs frequently between the power signal and the CSI-RS, the power-saving signal may be directly discarded. (2) The UE may continue to detect the power-saving signal transmitted in a punching manner, e.g., in the case where an RE collision occurs less frequently between the SSB and the power-saving signal. (3) The UE may discard the detection of the power-saving signal on the transmission resource for the power-saving signal colliding with the transmission resource for the high-priority signal, directly enter a wake-up state, and then detect the PDCCH within a subsequent DRX on duration.

In some possible embodiments of the present disclosure, the resource configuration method may further include, in the case that the transmission resource for the power-saving signal within the opportunity for DRX overlaps the transmission resource for the predetermined high-priority signal, transmitting indication information.

The indication information may be used to indicate the terminal to discard the detection of the power-saving signal on the transmission resource overlapping the transmission resource for the predetermined high-priority signal and to be maintained in the sleep state, or indicate the terminal to discard the detection of the power-saving signal on the transmission resource overlapping the transmission resource for the predetermined high-priority signal and enter the wake-up state, or indicate the terminal to detect the power-saving signal transmitted in a punching manner on the transmission resource overlapping the transmission resource for the predetermined high-priority signal.

In some embodiments of the present disclosure, the base station may use a semi-static configuration method through RRC signal, so as to notify the UE to select a processing mode when there is a collision between the transmission resource for the power-saving signal and the transmission for the high-priority signal. For example, one-bit signaling may be used, where 1 represents the UE is to be woken up directly, and 0 represents that the UE needs to continuously detect the power-saving signal transmitted in a punching manner, or two-bit signaling may be used to indicate the above-mentioned three behaviors of the UE. Of course, the indication information having more bits may also be used in some embodiments of the present disclosure.

Further, the configuring the transmission resource for the power-saving signal within the opportunity for DRX may include: configuring at least two candidate transmission resources for the power-saving signal within the opportunity for DRX; and determining the transmission resource for the power-saving signal within the opportunity for DRX in accordance with the at least two candidate transmission resources for the power-saving signal and the transmission resource for the predetermined high-priority signal.

The configuring the at least two candidate transmission resources for the power-saving signal within the opportunity for DRX may include configuring a plurality of resource windows in accordance with a predetermined configuration period, each resource window may include at least two candidate transmission resources, and the at least two candidate transmission resources in each resource window may include a default candidate transmission resource. The resource window may include a time-domain resource window and/or a frequency-domain resource window.

Here, the default candidate transmission resource may be specifically a first candidate transmission resource within the resource window.

Based on the above, the determining the transmission resource for the power-saving signal within the opportunity for DRX in accordance with the at least two candidate transmission resources for the power-saving signal and the transmission resource for the predetermined high-priority signal may include, in the case that the default candidate transmission resource for the power-saving signal overlaps the transmission resource for the predetermined high-priority signal, determining the transmission resource for the power-saving signal within the opportunity for DRX in accordance with the candidate transmission resources in the resource window other than the default candidate transmission resource.

The following description will be given in conjunction with the embodiments.

The base station may configure for the terminal a plurality of candidate transmission resources for the power-saving signal. When there is a collision between the transmission resource for the power-saving signal and the transmission resource for the predetermined high-priority signal, the base station may transmit the power-saving signal on the other candidate transmission resources. For example, the power-saving signal may be configured periodically (it is not excluded that a default time resource for the power-saving signal is aperiodic). Taking the time resource as an example, transmission positions of the plurality of candidate resources may be offset from a transmission position of the original power-saving signal, so a transmission time of the power-saving signal may not be periodic, as shown in FIG. 3 and FIG. 4.

Figure 3:
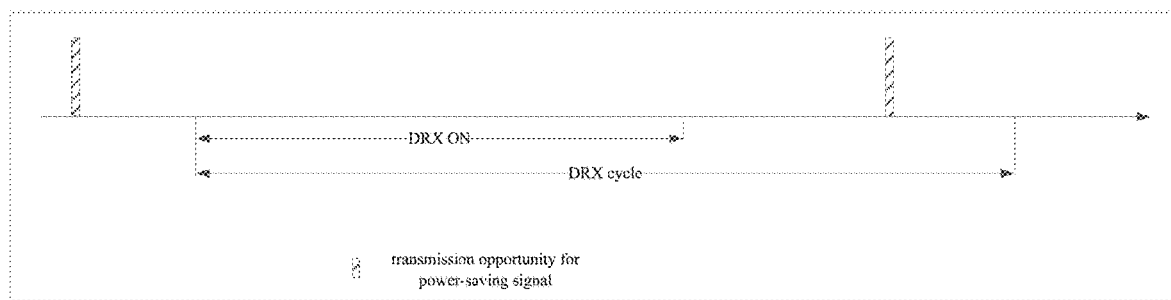
FIG. 3 is a schematic view showing a paging opportunity of a power-saving signal configured periodically by a network device.
Figure 4:
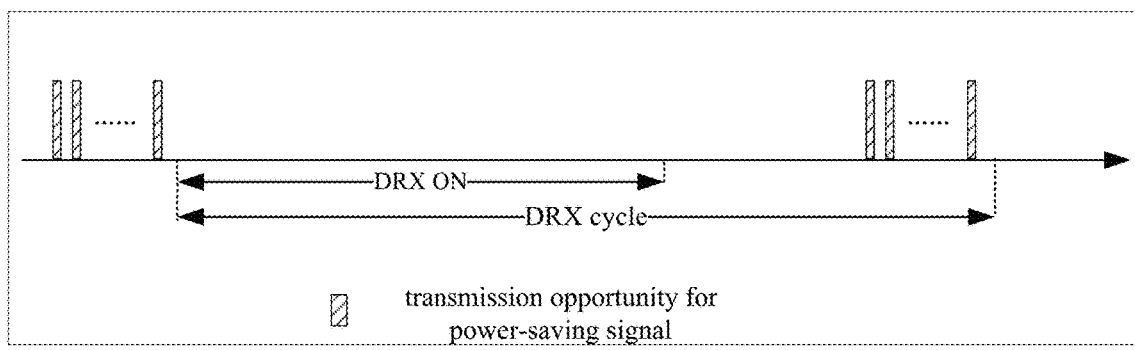
FIG. 4 is a schematic view showing a situation where the paging opportunity in FIG. 3 is enhanced to a sliding window in a time domain.

FIG. 3 shows a transmission opportunity for the power-saving signal configured periodically by the base station for the terminal, and FIG. 4 shows a sliding window (a time-domain resource window) for transmission opportunities obtained through enhancing one periodic transmission opportunity for the original power-saving signal. A plurality of candidate transmission opportunities is configured within the sliding window, e.g., when two immediately adjacent transmission opportunities are spaced apart from each other by 1 ms, one sliding window may include 5 transmission opportunities. When the UE needs to be woken up within an upcoming DRX on duration, i.e., when the base station needs to transmit the power-saving signal for the UE, an optimal first transmission opportunity may be a default transmission opportunity. When a previous transmission opportunity is blocked by the other signal, the power-saving signal may be transmitted on a nearest next transmission opportunity. When all the transmission opportunities have been blocked, the base station may discard the transmission of the power-saving signal currently.

In addition, when there is the power-saving signal that needs to be transmitted and the power-saving signal is not transmitted on the first transmission opportunity, the periodic transmission may be destroyed. When there is an unblocked transmission opportunity in the transmission opportunities within the sliding window, the UE may detect the power-saving signal on the corresponding transmission opportunity, and when the power-saving signal has been detected, the UE may wake a receiver up to detect the PDCCH within the DRX on duration; otherwise, the UE may continue to be in the sleep state.

Figure 5:
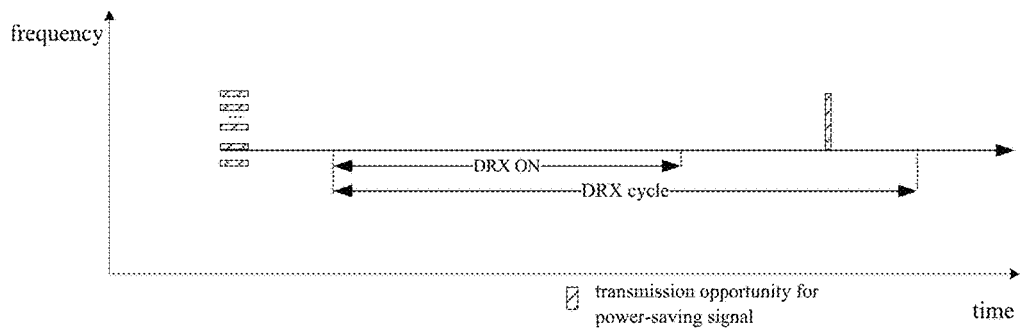
FIG. 5 is a schematic view showing a situation where the paging opportunity in FIG. 3 is enhanced to a sliding window in a frequency domain.

The above description relates to the timed-domain window, and the same processing may also be applied to a frequency-domain sliding window. For example, the base station may configure a plurality of candidate transmission frequency points for the power-saving signal. FIG. 5 shows an instance where a periodic transmission opportunity for the original power-saving signal is enhanced to a frequency-domain sliding window-based transmission opportunity. A plurality of candidate frequency-domain transmission resources is configured within the frequency-domain sliding window. When the UE needs to be woken up within an upcoming DRX on duration, i.e., when the base station needs to transmit the power-saving signal for the UE, an optimal first frequency point configured by the base station may be a default transmission resource. When a previous transmission opportunity is blocked by the other signal, the power-saving signal may be transmitted on a nearest next transmission opportunity. When all the transmission opportunities have been blocked, the base station may discard the transmission of the power-saving signal currently.

The instances of the time-domain sliding window and the frequency-domain sliding window have been described hereinabove. In some embodiments of the present disclosure, the time-domain sliding window and the frequency-domain sliding window may be provided simultaneously. The candidate transmission opportunities or the candidate transmission frequency points for the power-saving signal may be configured semi-statically by the base station through RRC signaling, or pre-agreed by the base station with the terminal. The candidate transmission opportunity for the power-saving signal (the time-domain transmission resource) may be a start point of the power-saving signal, an end point of the power-saving signal, or any pre-agreed position. Identically, the transmission frequency point for the power-saving signal may be a start point of the frequency-domain resource, an end point of the frequency-domain resource, or any pre-agreed position.

Further, the configuring the at least two candidate transmission resources for the power-saving signal within the opportunity for DRX may include configuring the at least two candidate transmission resources for the power-saving signal within the opportunity for DRX before a DRX on duration.

Based on the above, the determining the transmission resource for the power-saving signal within the opportunity for DRX in accordance with the at least two candidate transmission resources for the power-saving signal and the transmission for the predetermined high-priority signal may include: obtaining a distance value between each candidate transmission resource of the at least two candidate transmission resources and the transmission resource for the predetermined high-priority signal; selecting a target distance value from a plurality of distance values; and determining the transmission resource for the power-saving signal within the opportunity for DRX in accordance with the target distance value.

The selecting the target distance value from the plurality of distance values may include selecting a minimum distance value from distance values greater than a first predetermined threshold as the target distance value.

The determining the transmission resource for the power-saving signal within the opportunity for DRX in accordance with the target distance value may include: determining the transmission resource for the power-saving signal within the opportunity for DRX in accordance with a candidate transmission resource corresponding to the target distance value; or determining a pre-agreed candidate transmission resource as the transmission resource for the power-saving signal within the opportunity for DRX in the case that the target distance value is greater than a second predetermined threshold; or determining the transmission resource for the power-saving signal within the opportunity for DRX in accordance with an idle resource within a slot where the predetermined high-priority signal for calculating the target distance value is located.

The following description will be given in conjunction with specific embodiments.

The power-saving signal may be transmitted within the DRX OFF duration, and within the DRX OFF duration, the UE needs to receive a CSI-RS and an SSB, or further receive any other high-priority signals, to perform Radio Resource Management (RRM) measurement and search a signal in a cell. In the embodiments of the present disclosure, a method for the coexistence of the power-saving signal and the other high-priority signals in the time domain has been provided, and it may specifically include the following steps.

Step 1: the base station may configure a plurality of candidate transmission resources for the power-saving signal before the DRX ON duration semi-statically, e.g., through RRC signaling, or statically, e.g., in a pre-agreed manner.

Step 2: the base station may calculate a distance value between each candidate transmission resource and the transmission resource for the predetermined high-priority signal in Step 1, to obtain a plurality of distance values. Optimally, each distance value may be a distance value between a transmission start point of the power-saving signal and a transmission end point of the predetermined high-priority signal. Of course, any other distance calculation method may also be used.

Step 3: a target distance value dmin may be selected from the plurality of distance values. As mentioned hereinabove, after the obtaining of the distance values between the transmission resource for the predetermined high-priority signal and the at least two candidate transmission resources for the power-saving signal, one of the distance values may be selected for the subsequent step. The target distance value may be selected as follows. For example, a minimum distance value may be selected from distance values between the transmission resource for the high-priority signal, e.g., CSI-RS, and the at least two candidate transmission resources (or candidate transmission opportunities) for the power-saving signal which are greater than a first predetermined threshold Th0 as the target distance value. The first predetermined threshold Th0 may be a threshold determined in accordance with a time desired for switching to the reception of another signal after one signal has been received successfully, e.g., in accordance with an interval desired for switching to the reception of the power-saving signal after the CSI-RS has been received successfully, and in a special scenario, Th0 may be 0. There may exist a plurality of predetermined high-priority signals, e.g., CSI-RS, within the DRX OFF duration. Optimally, a distance value between the DCI-RS nearest to the DRX ON duration and the candidate transmission resource for receiving the power-saving signal may be calculated as the target distance value. Of course, any other pre-agreed selection mode may be applied to the predetermined high-priority signal. There may exist various predetermined high-priority signals. For example, the CSI-RS and the SSB may be considered as a same kind of signals during the calculation of the distance. In addition, the distance value may be calculated in accordance with a signal with a higher priority level, e.g., in accordance with the SSB rather than the CSI-RS.

Step 4: the transmission opportunity for the power-saving signal may be determined in accordance with the target distance value in Step 3. Scheme 1: the base station may transmit the power-saving signal on the candidate position for the power-saving signal corresponding to the distance value dmin obtained in Step 3. Scheme 2: when the distance value dmin obtained in Step 3 is greater than a certain threshold (second predetermined threshold) Th1, the base station may transmit the power-saving signal on a pre-agreed candidate position. Scheme 3: the base station may transmit the power-saving signal on an idle resource within a slot where the predetermined high-priority signal corresponding to dmin is located (the predetermined high-priority signal for calculating dmin), e.g., on first and second idle symbols reserved within a slot where the SSB is located.

Through this method, it is able to effectively prevent the occurrence of the collision between the power-saving signal and the predetermined high-priority signal and enable the predetermined high-priority signal to be transmitted at a position closer to the power-saving signal. Hence, a synchronization function of the predetermined high-priority signal, e.g., SSB, may be utilized as possible for the reception of the power-saving signal, and the UE may enter the sleep state conveniently after the continuous reception of the signals.

Further, the configuring the transmission resource for the power-saving signal within the opportunity for DRX may include configuring a carrier for the power-saving signal within the opportunity for DRX, and the carrier may be a primary carrier or a primary/secondary carrier.

In some embodiments of the present disclosure, the base station may semi-statically or statically configure the carrier for transmitting the power-saving signal, specifically through the following schemes. Scheme 1: the base station may transmit the power-saving signal for waking up the receiver within the DRX OFF duration merely on a primary carrier PCell or a primary/secondary PScell statically, i.e., in a pre-agreed manner. The NR system may include a non-standalone system and a standalone system on the basis of a networking mode. For the non-standalone system, the NR is connected to the LTE in a dual-connectivity manner, and the primary carrier for the NR is called as PScell. For the standalone system, the primary carrier for the NR is PCell, and the other secondary carrier is called as Scell. In the case that there is a large quantity of Scells, each Scell may be activated through the other signal within the DRX on duration, and there unnecessarily exist an SSB on the Scell. Hence, in order to reduce a resource overhead for transmitting the power-saving signal within the DRX OFF duration, the base station may not transmit the power-saving signal on the Scell. Scheme 2: the base station may configure the carrier for transmitting the power-saving signal semi-statically, i.e., through RRC signaling. For example, even when all data is transmitted on a high-frequency carrier, a low-frequency carrier may still be configured to transmit the power-saving signal. This is because, the power-saving signal has better reception performance at a low-frequency band, and a coverage of the low-frequency carrier is larger.

Further, the configuring the transmission resource for the power-saving signal within the opportunity for DRX may include configuring a BWP for the power-saving signal within the opportunity for DRX, and the BWP may be a cell-specific narrow-band BWP or a pre-agreed narrow-band BWP.

In some embodiments of the present disclosure, the base station may configure the BWP for transmitting the power-saving signal in a pre-agreed manner or semi-statically through RRC signaling. In terms of the carrier, the NR system performs transmission at a large bandwidth. In order to reduce the power consumption for the terminal, the BWPs may be configured for the data transmission for the UE. A plurality of BWPs may be configured for the UE on each carrier, and merely one active BWP may be configured for the UE at the same time. In order to receive the power-saving signal within the DRX OFF duration, it is necessary to warm up a Radio Frequency (RF) circuit in advance. The power-saving signal may merely occupy a relatively low bandwidth, but usually more electricity may be consumed to activate the entire band BWP as compared with one narrow-band BWP. Hence, in order to reduce the power consumption for the reception of the power-saving signal, an optimal power-saving signal transmission method may include transmitting the power-saving signal on a UE-specific narrow-band BWP. As speculated in an NR standard, at most four UE-specific BWPs are configured for each UE. Optimally, the base station may configure one narrow-band BWP for transmitting the power-saving signal semi-statically through RRC signaling. In addition, it may also be pre-agreed in the standard that a BWP with index=0 is used for transmitting the power-saving signal, and at this time, it is unnecessary to perform configuration through the RRC signaling, i.e., a static configuration is adopted. However, the base station may set the pre-agreed BWP for transmitting the power-saving signal as a power-saving narrow-band BWP.

The BWPs configured for a plurality of UEs to be woken up simultaneously may be different from each other. In order to reduce the resource overhead for the power-saving signal, the base station may also configure a cell-specific BWP for transmitting the power-saving signal semi-statically or statically, and the BWP may be a cell-specific initial BWP. In this way, it is merely necessary to agree in the standard, i.e., statically configure, that the power-saving signal is transmitted on the initial BWP without any signaling. Considering that the initial BWP is a cell-specific resource which is under strain, optimally, the base station may configure, through semi-static signaling, a cell-specific BWP different from the initial BWP for transmitting the power-saving signal. For example, the base station may configure a specific frequency-domain resource for transmitting the power-saving signal in the form of a bitmap. The configured frequency-domain resource may be consecutive or discrete, and it may be understood as that one cell-specific BWP is used for transmitting the power-saving signal for all users in the cell.

Further, the configuring the transmission resource for the power-saving signal within the opportunity for DRX may include configuring the transmission resource for the power-saving signal within the opportunity for DRX in accordance with a currently active BWP.

To be specific, the configuring the transmission resource for the power-saving signal within the opportunity for DRX in accordance with the currently active BWP may include configuring the transmission resource for the power-saving signal within the opportunity for DRX in accordance with a search space for a PDCCH corresponding to the currently active BWP.

Further, the transmission resource may include a first transmission resource and a second transmission resource, the first transmission resource may include a fixed frequency-domain resource and a variable time-domain resource, and the second transmission may include a fixed time-domain resource and a variable frequency-domain resource.

In some embodiments of the present disclosure, the base station may transmit the power-saving signal on the currently active BWP, i.e., a BWP on which the UE needs to perform PDCCH monitoring within an upcoming DRX cycle. In some embodiments of the present disclosure, the BWP for transmitting the power-saving signal may be determined. For example, within the upcoming DRX ON duration, the base station may transmit the power-saving signal within the search space configured for the UE for transmitting the PDCCH, and there is just no PDCCH transmission within the search space corresponding to the UE because it is in the DRX OFF duration. In addition, the first transmission resource may include the fixed frequency-domain resource and the variable time-domain resource, and the second transmission may include the fixed time-domain resource and the variable frequency-domain resource. For example, when the base station has semi-statically or statically configured a maximum quantity of Resource Elements (REs) occupied by the frequency-domain resource or in the frequency domain on some narrow-band BWPs, the quantity of Orthogonal Frequency Division Multiplexing (OFDM) symbols or slots occupied in the time domain may be variable in accordance with a size of a payload of the power-saving signal. For a large-band BWP, the base station may semi-statically or statically configure a size of the time-domain resource, e.g., an OFDM symbol, and a size of the slot, and the frequency-domain resource may be variable in accordance with the size of the payload of the power-saving signal.

Further, In some possible embodiments of the present disclosure, the transmission resource may be configured periodically, a configuration period of the transmission resource may be greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration may be the transmission resource for the power-saving signal.

In some embodiments of the present disclosure, a time configuration of the power-saving signal may also be highly related to a design scheme of the power-saving signal. The configuration of the DRX cycle for the UE is UE-specific, and when no constraint is put on the configuration of the DRX cycle for the UE, the power-saving signals for a plurality of UEs may overlap each other in the time domain. In this way, the power-saving signals may interfere with each other, and the performance of the power-saving signal may be destroyed seriously. Especially when the power-saving signal in on the basis of an orthogonal sequence, the orthogonality may be destroyed. Hence, the following time-domain transmission scheme shall be taken into consideration.

A time-domain configuration mode of the power-saving signal may not be bound to the DRX cycle, and the power-saving signal may be configured periodically like the other reference signals in the NR system. However, a period of the power-saving signal must be greater than the maximum time-domain length occupied by the power-saving signal configured by the base station. Hence, in some embodiments of the present disclosure, the transmission resource (a transmission position) for the power-saving signal may be configured periodically, the period of the power-saving signal must be greater than the maximum time-domain length occupied by the power-saving signal configured by the base station, and a candidate position in the DRX OFF duration closest to the upcoming DRX ON duration and spaced apart from the upcoming DRX ON duration by a gap greater than the third predetermined threshold may serve as a position for transmitting and detecting the power-saving signal. In this way, it is able to align the transmission start points of the power-saving signal with each other, and prevent the sequences from overlapping each other, thereby to reduce the occurrence of the interference between the UEs, and facilities the maintenance of the orthogonality.

Further, in some embodiments of the present disclosure, a start position of the DRX cycle may be the same as a start position of a cycle of a kernel power-saving signal, and the DRX cycle may be an integral multiple of the cycle of the kernel power-saving signal.

The power-saving signal may be a sequence, and the kernel power-saving signal may be a subsequence having a fixed length in the sequence.

To be specific, when the start position of the DRX cycle is the same as the start position of the cycle of the kernel power-saving signal, a first time corresponding to the start position of the DRX cycle may be an integral multiple of a second time corresponding to the start position of the cycle of the kernel power-saving signal.

In some embodiments of the present disclosure, the power-saving signal may be bound to the DRX cycle, i.e., there may exist a gap between the transmission position of the power-saving signal and the DRX on duration, and a maximum power-saving signal length may be configured. The power-saving signal may be transmitted from a starting point of the maximum power-saving signal length, and at this time, the power-saving signals transmitted continuously may overlap each other. Because the power-saving signal is constructed on the basis of the sequence, there always exist such a subsequence having a fixed length, e.g., 256 bits, that may be considered as a kernel power-saving signal, and a subsequent sequence may be time-domain repetition of the kernel power-saving signal. In addition, it is presumed that a cycle of the kernel power-saving signal is T, e.g., one slot or four OFDM symbols, and in some embodiments of the present disclosure, the starting points of all the DRX ON durations within the period T may be aligned with each other, so the orthogonality between the sequences may not be destroyed. However, at this time, the sequences may still overlap each other. In order to align the transmission times of the power-saving signal, it is necessary to appropriately configure the starting point of the DRX cycle. Generally speaking, the transmission start position of the power-saving signal and the starting point of the DRX ON duration may be fixed, and the DRX cycle may be configured periodically in a UE-specific manner. Hence, in some embodiments of the present disclosure, the power-saving signal may be bound to the DRX cycle, i.e., the transmission position of the power-saving signal may be always an agreed position before the DRX on duration. The start position of the DRX cycle configured by the base station for the UE may be the same as the start position of the period T of the kernel power-saving signal, and the DRX cycle may also be an integral multiple of the period T of the kernel power-saving signal. For example, the start position of the DRX cycle may be set as an integral multiple of the period T of the kernel power-saving signal, and the DRX cycle may also be an integral multiple of the period T of the kernel power-saving signal.

In some embodiments of the present disclosure, the resource configuration method may further include a power-saving signal having a wake-up function before the DRX on duration to wake up the UE to detect the PDCCH within the corresponding DRX on duration. Here, the power-saving signal having the wake-up function may be configured periodically.

In some possible embodiments of the present disclosure, the configuring the transmission resource for the power-saving signal within the opportunity for DRX statically or semi-statically may include: configuring the transmission resource for the power-saving signal through RRC signaling or physical layer dynamic signaling, the transmission resource for the power-saving signal including at least one of a DL symbol or slot, a UL symbol or slot, or a flexible symbol or slot; or configuring the transmission resource for the power-saving signal on a symbol or slot other than the UL symbol or slot and/or the flexible symbol or slot configured through dynamic signaling (i.e., the transmission resource for the power-saving signal having the wake-up function is not allowed to configured on the UL symbol or slot and/or the flexible symbol or slot configured through dynamic signaling). In the NR standard, the flexible slot or symbol is supported, and it may be used for uplink or downlink transmission depending on a scheduler of the base station. Here, when the transmission resource for the power-saving signal having the wake-up function includes the UL symbol or slot, the transmission of the power-saving signal may be discarded, or when the transmission resource for the power-saving signal having the wake-up function includes the flexible symbol or slot configured through the physical layer signaling, the transmission of the power-saving signal may be discarded. When the transmission resource for the power-saving signal includes the DL symbol or slot, the power-saving signal may be transmitted on the DL symbol or slot.

Here, the power-saving signal having the wake-up function (also called as a WUS) may be used to wake the UE up to detect the PDCCH within the corresponding DRX ON duration.

As mentioned hereinabove, In some possible embodiments of the present disclosure, the base station may transmit the WUS before the DRX ON duration, and the WUS may be configured periodically. For example, the WUS may be a PDCCH-based power-saving signal, and a search space corresponding thereto may be periodic. Because the DRX cycle is also periodic, usually the DRX cycle may be bound to the transmission position of the power-saving signal. For example, the power-saving signal may always be transmitted at a position with a fixed offset value before the DRX cycle, and usually the offset value is configured through high-layer signaling.

However, the time-domain resource for transmitting the power-saving signal is not necessarily a DL resource. In the NR, a frame structure may be configured through RRC signaling or physical layer dynamic signaling, and apart from the DL symbol or slot, or the UL symbol or slot, the frame structure may further include the flexible symbol or slot. Here, the flexible symbol or slot may be configured through both the RRC signaling and the physical layer signaling.

As speculated in the NR, the flexible symbol or slot configured through the RRC signaling may be used for uplink and downlink transmission, and the flexible symbol or slot indicated through the physical layer signaling may be used for downlink transmission.

Hence, when the transmission resource for the power-saving signal configured by the base station for the terminal includes the UL symbol or slot, i.e., when the downlink power-saving signal collides with the allocated uplink transmission resource, the base station may discard the transmission of the power-saving signal, or may not allow the configuration of the UL symbol or slot on the transmission resource for the power-saving signal. When the transmission resource for the power-saving signal configured by the base station for the terminal includes the flexible symbol or slot configured through the physical layer signaling, the base station may discard the transmission of the power-saving signal.

When the base station cannot transmit the downlink power-saving signal on the transmission resource for the power-saving signal due to the above-mentioned reasons (the UL or flexible symbol or slot), the UE may directly wake its receiver up and detect the PDCCH within the corresponding DRX cycle. The advantage lies in that the base station may transmit the power-saving signal continuously within the subsequent DRX cycle, so as to reduce latency and prevent the reception quality from being adversely affected. In addition, the UE may continue to perform a sleep operation and may not detect the power-saving signal or detect the PDCCH within the subsequent DRX cycle. The advantage arises from the power consumption, but the disadvantage lies in a relatively large latency. When the transmission resource for the power-saving signal configured by the base station for the terminal is the flexible symbol or slot configured through the RRC signaling, the base station may transmit the power-saving signal on the transmission resource, and the UE may detect the power-saving signal on the transmission resource corresponding to the power-saving signal.

According to the resource configuration method in the embodiments of the present disclosure, the transmission for the power-saving signal within the opportunity for DRX may be configured statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

Figure 6:
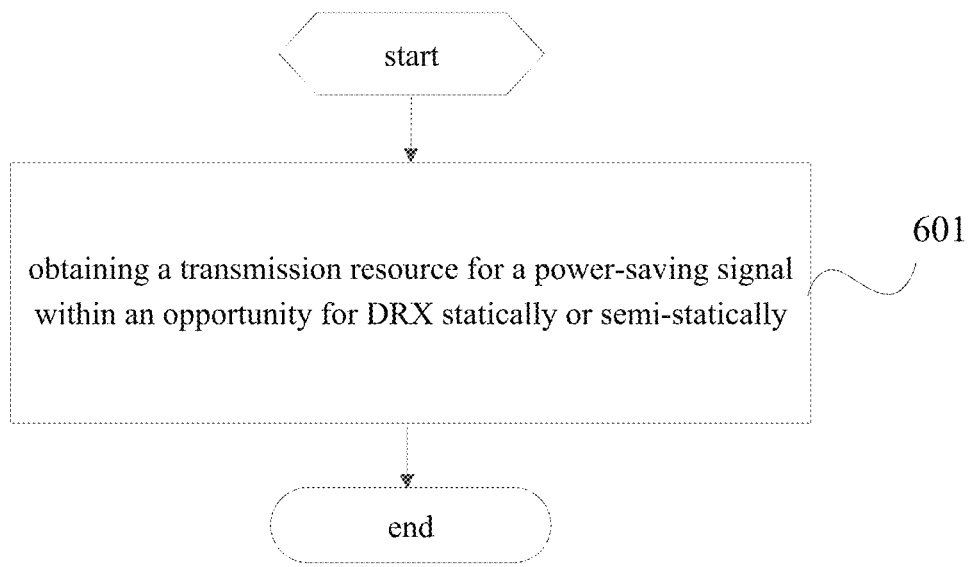
FIG. 6 is a flow chart of a resource obtaining method according to some embodiments of the present disclosure.

As shown in FIG. 6, the present disclosure provides in some embodiments a resource obtaining method for a terminal, which includes Step 601 of obtaining a transmission resource for a power-saving signal within an opportunity for DRX statically or semi-statically.

The obtaining the transmission resource for the power-saving signal within the opportunity for DRX semi-statically may include obtaining the transmission resource for the power-saving signal within the opportunity for DRX semi-statically through RRC signaling.

The obtaining the transmission resource for the power-saving signal within the opportunity for DRX statically may include obtaining the transmission resource for the power-saving signal within the opportunity for DRX statically in a pre-agreed manner.

In some embodiments of the present disclosure, the power-saving signal may be a sequence, e.g., a WUS.

In some embodiments of the present disclosure, when the power-saving signal has been detected within the opportunity for DRX, the terminal may monitor a PDCCH within a subsequent DRX on duration; otherwise, the terminal may be in a sleep state continuously and may not detect the PDCCH within the DRX on duration.

According to the resource obtaining method in the embodiments of the present disclosure, the transmission resource for the power-saving signal within the opportunity for DRX may be obtained statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

Subsequent to obtaining the transmission resource for the power-saving signal within the opportunity for DRX statically or semi-statically, the resource obtaining method may further include, in the case that the transmission resource for the power-saving signal within the opportunity for DRX overlaps a transmission resource for a predetermined high-priority signal, discarding the detection of the power-saving signal on the transmission resource overlapping the transmission resource for the predetermined high-priority signal or detecting the power-saving signal transmitted in a punching manner.

To be specific, in the case that the transmission resource for the power-saving signal within the opportunity for DRX overlaps the transmission resource for the predetermined high-priority signal, when the quantity of overlapping resources is greater than a target value (e.g., the quantity of overlapping REs is greater than the target value), the terminal may discard the detection of the power-saving signal on the transmission resource overlapping the transmission resource for the predetermined high-priority signal, and the terminal may be maintained in the sleep state or enter a wake-up state. When the quantity of the overlapping resources is smaller than or equal to the target value (e.g., the quantity of the overlapping REs is smaller than the target value), the terminal may detect the power-saving signal transmitted in a punching manner on the transmission resource overlapping the transmission resource for the predetermined high-priority signal.

Subsequent to obtaining the transmission resource for the power-saving signal within the opportunity for DRX, the resource obtaining method may further include: obtaining indication information, the indication information being transmitted by a network device in the case that the transmission resource for the power-saving signal within the opportunity for DRX overlaps the transmission resource for the predetermined high-priority signal; and discarding the detection of the power-saving signal on the transmission resource overlapping the transmission resource for the predetermined high-priority signal and maintaining a sleep state in accordance with the indication information, or discarding the detection of the power-saving signal on the transmission resource overlapping the transmission resource for the predetermined high-priority signal and entering a wake-up state in accordance with the indication information, or detecting the power-saving signal transmitted in a punching manner on the transmission resource overlapping the transmission resource for the predetermined high-priority signal.

The specific implementation thereof has been described in the method embodiments at a network device side, and thus will not be particularly defined herein.

Subsequent to obtaining the transmission resource for the power-saving signal within the opportunity for DRX, the resource obtaining method may further include: obtaining the power-saving signal on the transmission resource; and monitoring the PDCCH within a DRX on duration after the opportunity for DRX in accordance with the power-saving signal.

The resource obtaining method may further include: when the transmission resource for the power-saving signal configured by the network device is incapable of being used to transmit the power-saving signal, directly waking up, by the terminal, a receiver and monitoring the PDCCH within a corresponding DRX cycle; or when the transmission resource for the power-saving signal configured by the network device is incapable of being used to transmit the power-saving signal, performing, by the terminal, a sleep operation continuously and not detecting the PDCCH within a subsequent DRX cycle. Here, when the transmission resource for the power-saving signal configured by the network device is incapable of being used to transmit the power-saving signal, the transmission resource for the power-saving signal may include a UL symbol or slot, or a flexible symbol or slot configured through physical layer signaling, or both. A power-saving signal having a wake-up function may be used to wake up the terminal to detect the PDCCH within the corresponding DRX on duration.

The resource obtaining method may further includes, when the transmission resource for the energy signal configured for the terminal is a flexible symbol or slot configured through RRC signaling, detecting, by the terminal, the power-saving signal on the transmission resource for the power-saving signal.

In some embodiments of the present disclosure, the terminal may determine whether to detect the PDCCH within the DRX on duration in accordance with the power-saving signal, so as to reduce the unnecessary PDCCH detection, thereby to reduce the power consumption for the terminal.

In some embodiments of the present disclosure, the terminal may obtain a carrier for the power-saving signal within the opportunity for DRX, wherein the carrier is a primary carrier. Alternatively, the terminal may obtain the transmission resource for the power-saving signal within the opportunity for DRX in accordance with a currently active BWP.

Figure 7:
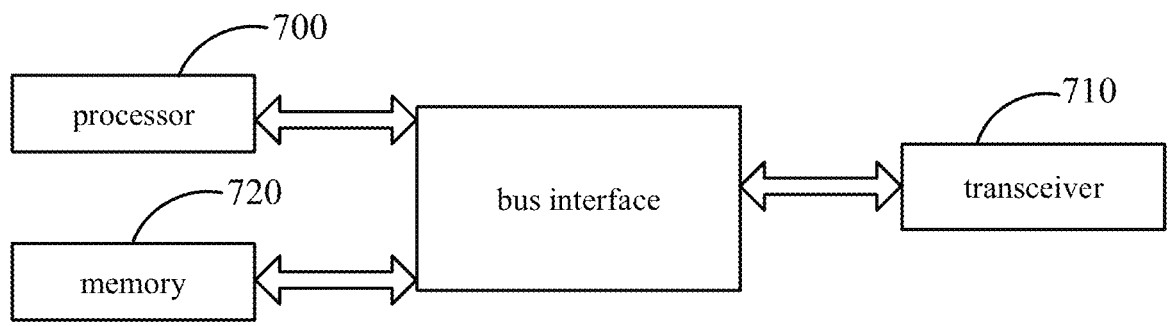
FIG. 7 is a structural block diagram of a network device according to some embodiments of the present disclosure.

As shown in FIG. 7, the present disclosure further provides in some embodiments a network device, which may be specifically a base station. The network device includes a memory 720, a processor 700, a transceiver 710, a bus interface, and a computer program stored in the memory 720 and executed by the processor 700. The processor 700 is configured to read the computer program in the memory 720, so as to configure a transmission resource for a power-saving signal within an opportunity for DRX statically or semi-statically.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. The bus interface may be provided, and the transceiver 710 may consist of a plurality of elements, i.e., a transmitter and a receiver for communication with any other devices over a transmission medium. The processor 700 may take charge of managing the bus architecture as well as general processings. The memory 720 may store therein data for the operation of the processor 700.

In some possible embodiments of the present disclosure, the processor 700 is further configured to read the computer program in the memory 720 so as to: configure at least two candidate transmission resources for the power-saving signal within the opportunity for DRX; and determine the transmission resource for the power-saving signal within the opportunity for DRX in accordance with the at least two candidate transmission resources for the power-saving signal and a transmission resource for a predetermined high-priority signal.

In some possible embodiments of the present disclosure, the processor 700 is further configured to read the computer program in the memory 720 so as to configure a plurality of resource windows in accordance with a predetermined configuration period, each resource window includes at least two candidate transmission resources, and the at least two candidate transmission resources in each resource window may include a default candidate transmission resource.

In some possible embodiments of the present disclosure, the resource window may include a time-domain resource window and/or a frequency-domain resource window.

In some possible embodiments of the present disclosure, the processor 700 is further configured to read the computer program in the memory 720 so as to, in the case that the default candidate transmission resource for the power-saving signal overlaps the transmission resource for the predetermined high-priority signal, determine the transmission resource for the power-saving signal within the opportunity for DRX in accordance with the candidate transmission resources in the resource window other than the default candidate transmission resource.

In some possible embodiments of the present disclosure, the processor 700 is further configured to read the computer program in the memory 720 so as to configure the at least two candidate transmission resources for the power-saving signal within the opportunity for DRX before a DRX on duration.

In some possible embodiments of the present disclosure, the processor 700 is further configured to read the computer program in the memory 720 so as to: obtain a distance value between each candidate transmission resource of the at least two candidate transmission resources and the transmission resource for the predetermined high-priority signal; select a target distance value from a plurality of distance values; and determine the transmission resource for the power-saving signal within the opportunity for DRX in accordance with the target distance value.

In some possible embodiments of the present disclosure, the processor 700 is further configured to read the computer program in the memory 720 so as to select a minimum distance value from distance values greater than a first predetermined threshold as the target distance value.

In some possible embodiments of the present disclosure, the processor 700 is further configured to read the computer program in the memory 720 so as to: determine the transmission resource for the power-saving signal within the opportunity for DRX in accordance with a candidate transmission resource corresponding to the target distance value; or determine a pre-agreed candidate transmission resource as the transmission resource for the power-saving signal within the opportunity for DRX in the case that the target distance value is greater than a second predetermined threshold; or determine the transmission resource for the power-saving signal within the opportunity for DRX in accordance with an idle resource within a slot where the predetermined high-priority signal for calculating the target distance value is located.

In some possible embodiments of the present disclosure, the processor 700 is further configured to read the computer program in the memory 720 so as to configure a carrier for the power-saving signal within the opportunity for DRX, and the carrier may be a primary carrier or a primary/secondary carrier.

In some possible embodiments of the present disclosure, the processor 700 is further configured to read the computer program in the memory 720 so as to configure a BWP for the power-saving signal within the opportunity for DRX, and the BWP may be a cell-specific narrow-band BWP or a pre-agreed narrow-band BWP.

In some possible embodiments of the present disclosure, the processor 700 is further configured to read the computer program in the memory 720 so as to configure the transmission resource for the power-saving signal within the opportunity for DRX in accordance with a currently active BWP.

In some possible embodiments of the present disclosure, the processor 700 is further configured to read the computer program in the memory 720 so as to configure the transmission resource for the power-saving signal within the opportunity for DRX in accordance with a search space for a PDCCH corresponding to the currently active BWP.

In some possible embodiments of the present disclosure, the transmission resource may include a first transmission resource and a second transmission resource, the first transmission resource may include a fixed frequency-domain resource and a variable time-domain resource, and the second transmission may include a fixed time-domain resource and a variable frequency-domain resource.

In some possible embodiments of the present disclosure, the processor 700 is further configured to read the computer program in the memory 720 so as to, in the case that the transmission resource for the power-saving signal for the opportunity for DRX overlaps the transmission resource for the predetermined high-priority signal, discard the transmission of the power-saving signal on the transmission resource overlapping the transmission resource for the predetermined high-priority signal or transmit the power-saving signal in a punching manner.

In some possible embodiments of the present disclosure, the processor 700 is further configured to read the computer program in the memory 720 so as to, when the transmission resource for the power-saving signal for the opportunity for DRX overlaps the transmission resource for the predetermined high-priority signal, transmit indication information. The indication information may be used to indicate a terminal to discard the detection of the power-saving signal on the transmission resource overlapping the transmission resource for the predetermined high-priority signal and to be maintained in a sleep state, or indicate the terminal to discard the detection of the power-saving signal on the transmission resource overlapping the transmission resource for the predetermined high-priority signal and enter a wake-up state, or indicate the terminal to detect the power-saving signal transmitted in a punching manner on the transmission resource overlapping the transmission resource for the predetermined high-priority signal.

In some possible embodiments of the present disclosure, the processor 700 is further configured to read the computer program in the memory 720 so as to, when the transmission resource for the power-saving signal within the opportunity for DRX does not overlap the transmission resource for the predetermined high-priority signal, transmit the power-saving signal on the transmission resource.

In some possible embodiments of the present disclosure, the predetermined high-priority signal may include at least one of an SIB, a CSI-RS, RMSI, a TRS or OSI.

In some possible embodiments of the present disclosure, the transmission resource may be configured periodically, a configuration period of the transmission resource may be greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration may be the transmission resource for the power-saving signal.

In some possible embodiments of the present disclosure, a start position of a DRX cycle may be the same as a start position of a cycle of a kernel power-saving signal, and the DRX cycle may be an integral multiple of the cycle of the kernel power-saving signal. The power-saving signal may be a sequence, and the kernel power-saving signal may be a subsequence having a fixed length in the sequence.

According to the network device in the embodiments of the present disclosure, the transmission resource for the power-saving signal within the opportunity for DRX may be configured statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

The present disclosure further provides in some embodiments a computer-readable storage medium storing therein a computer program. The computer program is executed by a processor so as to configure a transmission resource for a power-saving signal within an opportunity for DRX statically or semi-statically.

The computer program is executed by the processor so as to implement the above-mentioned method at the network device side, which will thus not be particularly defined herein.

Figure 8:
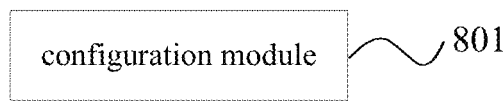
FIG. 8 is a schematic view showing modules of the network device according to some embodiments of the present disclosure.

As shown in FIG. 8, the present disclosure further provides in some embodiments a network device, which includes a configuration module 801 configured to configure a transmission resource for a power-saving signal within an opportunity for DRX statically or semi-statically.

In some possible embodiments of the present disclosure, the configuration module may include: a configuration submodule configured to configure at least two candidate transmission resources for the power-saving signal within the opportunity for DRX; and a determination submodule configured to determine the transmission resource for the power-saving signal within the opportunity for DRX in accordance with the at least two candidate transmission resources for the power-saving signal and a transmission resource for a predetermined high-priority signal.

In some possible embodiments of the present disclosure, the configuration submodule is further configured to configure a plurality of resource windows in accordance with a predetermined configuration period, each resource window may include at least two candidate transmission resources, and the at least two candidate transmission resources in each resource window may include a default candidate transmission resource.

In some possible embodiments of the present disclosure, the resource window may include a time-domain resource window and/or a frequency-domain resource window.

In some possible embodiments of the present disclosure, the determination submodule is further configured to, in the case that the default candidate transmission resource for the power-saving signal overlaps the transmission resource for the predetermined high-priority signal, determine the transmission resource for the power-saving signal within the opportunity for DRX in accordance with the candidate transmission resources in the resource window other than the default candidate transmission resource.

In some possible embodiments of the present disclosure, the configuration submodule is further configured to configure the at least two candidate transmission resources for the power-saving signal within the opportunity for DRX before a DRX on duration.

In some possible embodiments of the present disclosure, the determination submodule may include: an obtaining unit configured to obtain a distance value between each candidate transmission resource of the at least two candidate transmission resources and the transmission resource for the predetermined high-priority signal; a selection unit configured to select a target distance value from a plurality of distance values; and a determination unit configured to determine the transmission resource for the power-saving signal within the opportunity for DRX in accordance with the target distance value.

In some possible embodiments of the present disclosure, the selection unit is further configured to select a minimum distance value from distance values greater than a first predetermined threshold as the target distance value.

In some possible embodiments of the present disclosure, the determination unit is further configured to: determine the transmission resource for the power-saving signal within the opportunity for DRX in accordance with a candidate transmission resource corresponding to the target distance value; or determine a pre-agreed candidate transmission resource as the transmission resource for the power-saving signal within the opportunity for DRX in the case that the target distance value is greater than a second predetermined threshold; or determine the transmission resource for the power-saving signal within the opportunity for DRX in accordance with an idle resource within a slot where the predetermined high-priority signal for calculating the target distance value is located.

In some possible embodiments of the present disclosure, the configuration module is further configured to configure a carrier for the power-saving signal within the opportunity for DRX, and the carrier may be a primary carrier or a primary/secondary carrier.

In some possible embodiments of the present disclosure, the configuration module is further configured to configure a BWP for the power-saving signal within the opportunity for DRX, and the BWP may be a cell-specific narrow-band BWP or a pre-agreed narrow-band BWP.

In some possible embodiments of the present disclosure, the configuration module is further configured to configure the transmission resource for the power-saving signal within the opportunity for DRX in accordance with a currently active BWP.

In some possible embodiments of the present disclosure, the configuration module is further configured to configure the transmission resource for the power-saving signal within the opportunity for DRX in accordance with a search space for a PDCCH corresponding to the currently active BWP.

In some possible embodiments of the present disclosure, the transmission resource may include a first transmission resource and a second transmission resource, the first transmission resource may include a fixed frequency-domain resource and a variable time-domain resource, and the second transmission may include a fixed time-domain resource and a variable frequency-domain resource.

In some possible embodiments of the present disclosure, the network device may further include a first transmission module configured to, in the case that the transmission resource for the power-saving signal for the opportunity for DRX overlaps the transmission resource for the predetermined high-priority signal, discard the transmission of the power-saving signal on the transmission resource overlapping the transmission resource for the predetermined high-priority signal or transmit the power-saving signal in a punching manner.

In some possible embodiments of the present disclosure, the network device may further include a second transmission module configured to, when the transmission resource for the power-saving signal for the opportunity for DRX overlaps the transmission resource for the predetermined high-priority signal, transmit indication information. The indication information may be used to indicate a terminal to discard the detection of the power-saving signal on the transmission resource overlapping the transmission resource for the predetermined high-priority signal and to be maintained in a sleep state, or indicate the terminal to discard the detection of the power-saving signal on the transmission resource overlapping the transmission resource for the predetermined high-priority signal and enter a wake-up state, or indicate the terminal to detect the power-saving signal transmitted in a punching manner on the transmission resource overlapping the transmission resource for the predetermined high-priority signal.

In some possible embodiments of the present disclosure, the network device may further include a third transmission module configured to, when the transmission resource for the power-saving signal within the opportunity for DRX does not overlap the transmission resource for the predetermined high-priority signal, transmit the power-saving signal on the transmission resource.

In some possible embodiments of the present disclosure, the predetermined high-priority signal may include at least one of an SIB, a CSI-RS, RMSI, a TRS or OSI.

In some possible embodiments of the present disclosure, the transmission resource may be configured periodically, a configuration period of the transmission resource may be greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration may be the transmission resource for the power-saving signal.

In some possible embodiments of the present disclosure, a start position of a DRX cycle may be the same as a start position of a cycle of a kernel power-saving signal, and the DRX cycle may be an integral multiple of the cycle of the kernel power-saving signal. The power-saving signal may be a sequence, and the kernel power-saving signal may be a subsequence having a fixed length in the sequence.

It should be appreciated that, the implementation of the network device may refer to the implementation of the above-mentioned method at the network device side, and thus will not be particularly defined herein.

According to the network device in the embodiments of the present disclosure, the transmission resource for the power-saving signal within the opportunity for DRX may be configured statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

Figure 9:
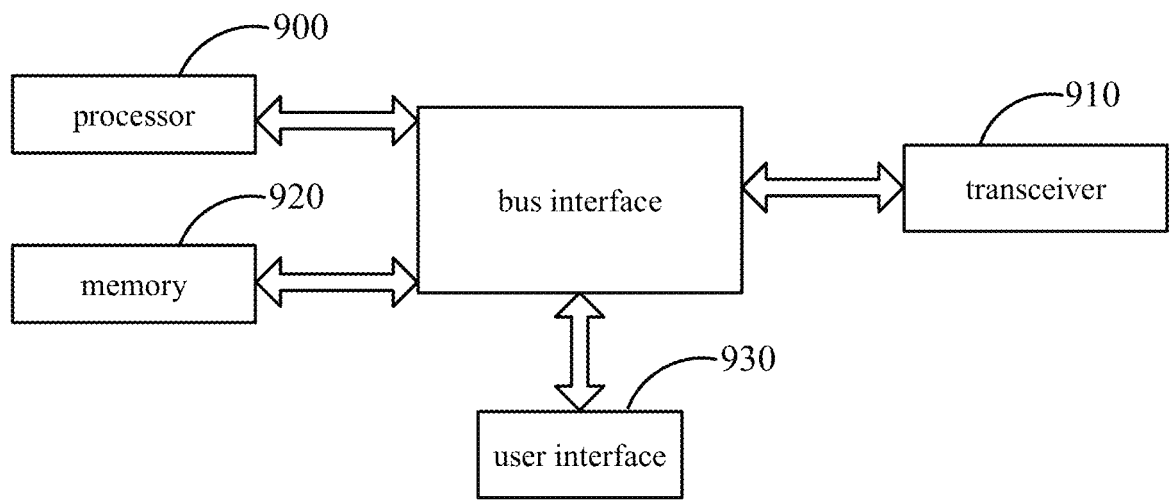
FIG. 9 is a structural block diagram of a terminal according to some embodiments of the present disclosure.

As shown in FIG. 9, the present disclosure further provides in some embodiments a terminal, which includes a transceiver, a memory, a processor, and a computer program stored in the memory and executed by the processor. The processor is configured to execute the computer program so as to obtain a transmission resource for a power-saving signal within an opportunity for DRX statically or semi-statically.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. With respect to different UEs, a user interface 930 may also be provided for devices which are to be arranged inside or outside the UE, and these devices may include but not limited to a keypad, a display, a speaker, a microphone and a joystick. The processor 900 may take charge of managing the bus architecture as well as general processings. The memory 920 may store therein data for the operation of the processor 900.

In some possible embodiments of the present disclosure, the processor 900 is further configured to read the computer program in the memory 920 so as to, in the case that the transmission resource for the power-saving signal within the opportunity for DRX overlaps a transmission resource for a predetermined high-priority signal, discard the detection of the power-saving signal on the transmission resource overlapping the transmission resource for the predetermined high-priority signal or detect the power-saving signal transmitted in a punching manner.

In some possible embodiments of the present disclosure, the processor 900 is further configured to read the computer program in the memory 920 so as to: obtain indication information, the indication information being transmitted by a network device in the case that the transmission resource for the power-saving signal within the opportunity for DRX overlaps the transmission resource for the predetermined high-priority signal; and discard the detection of the power-saving signal on the transmission resource overlapping the transmission resource for the predetermined high-priority signal and maintain a sleep state in accordance with the indication information, or discard the detection of the power-saving signal on the transmission resource overlapping the transmission resource for the predetermined high-priority signal and enter a wake-up state in accordance with the indication information, or detect the power-saving signal transmitted in a punching manner on the transmission resource overlapping the transmission resource for the predetermined high-priority signal.

In some possible embodiments of the present disclosure, the processor 900 is further configured to read the computer program in the memory 920 so as to: obtain the power-saving signal on the transmission resource; and monitor a PDCCH within a DRX on duration after the opportunity for DRX in accordance with the power-saving signal.

According to the terminal in the embodiments of the present disclosure, the transmission resource for the power-saving signal within the opportunity for DRX may be obtained statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

The present disclosure further provides in some embodiments a computer-readable storage medium storing therein a computer program. The computer program is executed by a processor, so as to obtain a transmission resource for a power-saving signal within an opportunity for DRX statically or semi-statically.

The computer program is executed by the processor so as to implement the above-mentioned method at the terminal side, which will thus not be particularly defined herein.

Figure 10:
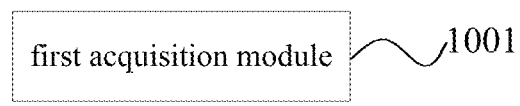
FIG. 10 is a schematic view showing modules of the terminal according to some embodiments of the present disclosure.

As shown in FIG. 10, the present disclosure further provides in some embodiments a terminal, which includes a first obtaining module 1001 configured to obtain a transmission resource for a power-saving signal within an opportunity for DRX statically or semi-statically.

In some embodiments of the present disclosure, the terminal may further include a first processing module configured to, in the case that the transmission resource for the power-saving signal within the opportunity for DRX overlaps a transmission resource for a predetermined high-priority signal, discard the detection of the power-saving signal on the transmission resource overlapping the transmission resource for the predetermined high-priority signal or detect the power-saving signal transmitted in a punching manner.

In some embodiments of the present disclosure, the terminal may further include: a second obtaining module configured to obtain indication information, the indication information being transmitted by a network device in the case that the transmission resource for the power-saving signal within the opportunity for DRX overlaps the transmission resource for the predetermined high-priority signal; and a second processing module configured to discard the detection of the power-saving signal on the transmission resource overlapping the transmission resource for the predetermined high-priority signal and maintain a sleep state in accordance with the indication information, or discard the detection of the power-saving signal on the transmission resource overlapping the transmission resource for the predetermined high-priority signal and enter a wake-up state in accordance with the indication information, or detect the power-saving signal transmitted in a punching manner on the transmission resource overlapping the transmission resource for the predetermined high-priority signal.

In some embodiments of the present disclosure, the terminal may further include: a third obtaining module configured to obtain the power-saving signal on the transmission resource; and a monitoring module configured to monitor a PDCCH within a DRX on duration after the opportunity for DRX in accordance with the power-saving signal.

According to the terminal in the embodiments of the present disclosure, the transmission resource for the power-saving signal within the opportunity for DRX may be obtained statically or semi-statically, so as to facilitate the subsequent transmission of the power-saving signal within the opportunity for DRX and enable the terminal to determine whether it is necessary to monitor the PDCCH within the DRX on duration in accordance with the power-saving signal. As a result, it is able to reduce the unnecessary PDCCH detection, thereby to reduce the power consumption for the terminal.

It should be further appreciated that, serial numbers of the steps shall not be used to define the order of the steps, and instead, the order of the steps shall be determined in accordance with their functions and internal logics.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource configuration method, comprising:
    configuring a transmission resource for a power-saving signal within an opportunity for Discontinuous Reception (DRX) semi-statically,
    wherein the configuring the transmission resource for the power-saving signal within the opportunity for DRX semi-statically comprises:
    configuring the transmission resource for the power-saving signal within the opportunity for DRX in accordance with a currently active Bandwidth Part (BWP), wherein the currently active BWP is the currently active BWP on a primary carrier or a primary secondary carrier.

2. The resource configuration method according to claim 1, wherein the configuring the transmission resource for the power-saving signal within the opportunity for DRX comprises:
    configuring at least two candidate transmission resources for the power-saving signal within the opportunity for DRX; and
    determining the transmission resource for the power-saving signal within the opportunity for DRX in accordance with the at least two candidate transmission resources for the power-saving signal and a transmission resource for a predetermined high-priority signal.

3. The resource configuration method according to claim 2, wherein the configuring the at least two candidate transmission resources for the power-saving signal within the opportunity for DRX comprises:
    configuring a plurality of resource windows in accordance with a predetermined configuration period, each resource window of the plurality of resource windows comprises at least two candidate transmission resources, and the at least two candidate transmission resources comprise a default candidate transmission resource,
    wherein each of the plurality of resource windows comprises a time-domain resource window and/or a frequency-domain resource window; or
    configuring the at least two candidate transmission resources for the power-saving signal within the opportunity for DRX before a DRX on duration.

4. The resource configuration method according to claim 3, wherein the determining the transmission resource for the power-saving signal within the opportunity for DRX in accordance with the at least two candidate transmission resources for the power-saving signal and the transmission resource for the predetermined high-priority signal comprises:
    in the case that the default candidate transmission resource for the power-saving signal overlaps the transmission resource for the predetermined high-priority signal, determining the transmission resource for the power-saving signal within the opportunity for DRX in accordance with the candidate transmission resources in the resource window other than the default candidate transmission resource.

5. The resource configuration method according to claim 2, wherein the determining the transmission resource for the power-saving signal within the opportunity for DRX in accordance with the at least two candidate transmission resources for the power-saving signal and the transmission for the predetermined high-priority signal comprises:
    obtaining a distance value between each candidate transmission resource of the at least two candidate transmission resources and the transmission resource for the predetermined high-priority signal;
    selecting a target distance value from a plurality of distance values; and
    determining the transmission resource for the power-saving signal within the opportunity for DRX in accordance with the target distance value.

6. The resource configuration method according to claim 5, wherein the selecting the target distance value from the plurality of distance values comprises:
    selecting a minimum distance value from distance values greater than a first predetermined threshold as the target distance value.

7. The resource configuration method according to claim 5, wherein the determining the transmission resource for the power-saving signal within the opportunity for DRX in accordance with the target distance value comprises:
    determining the transmission resource for the power-saving signal within the opportunity for DRX in accordance with a candidate transmission resource corresponding to the target distance value; or
    determining a pre-agreed candidate transmission resource as the transmission resource for the power-saving signal within the opportunity for DRX in the case that the target distance value is greater than a second predetermined threshold; or
    determining the transmission resource for the power-saving signal within the opportunity for DRX in accordance with an idle resource within a slot where the predetermined high-priority signal for calculating the target distance value is located.

8. The resource configuration method according to claim 1, wherein the configuring the transmission resource for the power-saving signal within the opportunity for DRX further comprises:

configuring a carrier for the power-saving signal within the opportunity for DRX, wherein the carrier is a primary carrier.

9. The resource configuration method according to claim 1, wherein the configuring the transmission resource for the power-saving signal within the opportunity for DRX in accordance with the currently active BWP comprises:
configuring the transmission resource for the power-saving signal within the opportunity for DRX in accordance with a search space for a Physical Downlink Control Channel (PDCCH) corresponding to the currently active BWP;
wherein the transmission resource comprises a first transmission resource and a second transmission resource, the first transmission resource comprises a fixed frequency-domain resource and a variable time-domain resource, and the second transmission comprises a fixed time-domain resource and a variable frequency-domain resource.

10. The resource configuration method according to claim 1, wherein subsequent to configuring the transmission resource for the power-saving signal within the opportunity for DRX semi-statically, the resource configuration method further comprises:
in the case that the transmission resource for the power-saving signal for the opportunity for DRX overlaps the transmission resource for the predetermined high-priority signal, discarding the transmission of the power-saving signal on the transmission resource overlapping the transmission resource for the predetermined high-priority signal; or
when the transmission resource for the power-saving signal within the opportunity for DRX does not overlap the transmission resource for the predetermined high-priority signal, transmitting the power-saving signal on the transmission resource.

11. The resource configuration method according to claim 10, further comprising:
when the transmission resource for the power-saving signal for the opportunity for DRX overlaps the transmission resource for the predetermined high-priority signal, transmitting indication information,
wherein the indication information is used to indicate a terminal to discard the detection of the power-saving signal on the transmission resource overlapping the transmission resource for the predetermined high-priority signal and to be maintained in a sleep state, or indicate the terminal to discard the detection of the power-saving signal on the transmission resource overlapping the transmission resource for the predetermined high-priority signal and enter a wake-up state.

12. The resource configuration method according to claim 1, wherein the transmission resource is configured periodically, a configuration period of the transmission resource is greater than a maximum time-domain length of the power-saving signal configured by the base station, and in at least one transmission resource of the transmission resources within the opportunity for DRX, a gap between an end position of which and a start position of a next DRX on duration is greater than a third predetermined threshold, a transmission resource closest to the start position of the next DRX on duration is the transmission resource for the power-saving signal,
wherein a start position of the DRX cycle is the same as a start position of a cycle of a kernel power-saving signal, and the DRX cycle is an integral multiple of the cycle of the kernel power-saving signal, wherein the power-saving signal is a sequence, and the kernel power-saving signal is a subsequence having a fixed length in the sequence.

13. The resource configuration method according to claim 1, wherein the configuring the transmission resource for the power-saving signal within the opportunity for DRX semi-statically comprises:
configuring the transmission resource for the power-saving signal through Radio Resource Control (RRC) signaling or physical layer dynamic signaling, and the transmission resource for the power-saving signal comprises at least one of a Downlink (DL) symbol or slot, an Uplink (UL) symbol or slot, or a flexible symbol or slot; or
configuring the transmission resource for the power-saving signal semi-statically on a symbol or slot other than the UL symbol or slot and/or the flexible symbol or slot configured through dynamic signaling.

14. The resource configuration method according to claim 13, further comprising:
when the transmission resource for the power-saving signal comprises a DL symbol or slot, transmitting the power-saving signal on the DL symbol or slot;
when the transmission resource for the power-saving signal comprises an UL symbol or slot, discarding the transmission of the power-saving signal; or
when the transmission resource for the power-saving signal comprises a flexible symbol or slot configured through physical layer signaling, discarding the transmission of the power-saving signal.

15. A resource obtaining method, comprising:
obtaining a transmission resource for a power-saving signal within an opportunity for Discontinuous Reception (DRX) semi-statically,
wherein the obtaining the transmission resource for the power-saving signal within the opportunity for DRX semi-statically comprises:
obtaining the transmission resource for the power-saving signal within the opportunity for DRX in accordance with a currently active Bandwidth Part (BWP), wherein the currently active BWP is the currently active BWP on a primary carrier or a primary secondary carrier.

16. The resource obtaining method according to claim 15, wherein subsequent to obtaining the transmission resource for the power-saving signal within the opportunity for DRX statically or semi-statically, the resource obtaining method further comprises:
in the case that the transmission resource for the power-saving signal within the opportunity for DRX overlaps a transmission resource for a predetermined high-priority signal, discarding the detection of the power-saving signal on the transmission resource overlapping the transmission resource for the predetermined high-priority signal.

17. The resource obtaining method according to claim 15, wherein subsequent to obtaining the transmission resource for the power-saving signal within the opportunity for DRX, the resource obtaining method further comprises:
obtaining indication information, the indication information being transmitted by a network device in the case that the transmission resource for the power-saving signal within the opportunity for DRX overlaps the transmission resource for the predetermined high-priority signal; and
discarding the detection of the power-saving signal on the transmission resource overlapping the transmission resource for the predetermined high-priority signal and maintaining a sleep state in accordance with the indication information, or discarding the detection of the power-saving signal on the transmission resource overlapping the transmission resource for the predetermined high-priority signal and entering a wake-up state in accordance with the indication information, or obtaining the power-saving signal on the transmission resource; and monitoring a Physical Downlink Control Channel (PDCCH) within a DRX on duration after the opportunity for DRX in accordance with the power-saving signal.

18. The resource obtaining method according to claim 15, wherein the configuring the transmission resource for the power-saving signal within the opportunity for DRX comprises:

obtaining a carrier for the power-saving signal within the opportunity for DRX, wherein the carrier is a primary carrier.

19. A network device, comprising a transceiver, a memory, a processor, and a computer program stored in the memory and executed by the processor, wherein the processor is configured to execute the computer program so as to realize the resource configuration method according to claim 1.

20. A terminal, comprising a transceiver, a memory, a processor, and a computer program stored in the memory and executed by the processor, wherein the processor is configured to execute the computer program so as to realize the resource obtaining method according to claim 15.

* * * * *